UNITED STATES PATENT OFFICE.

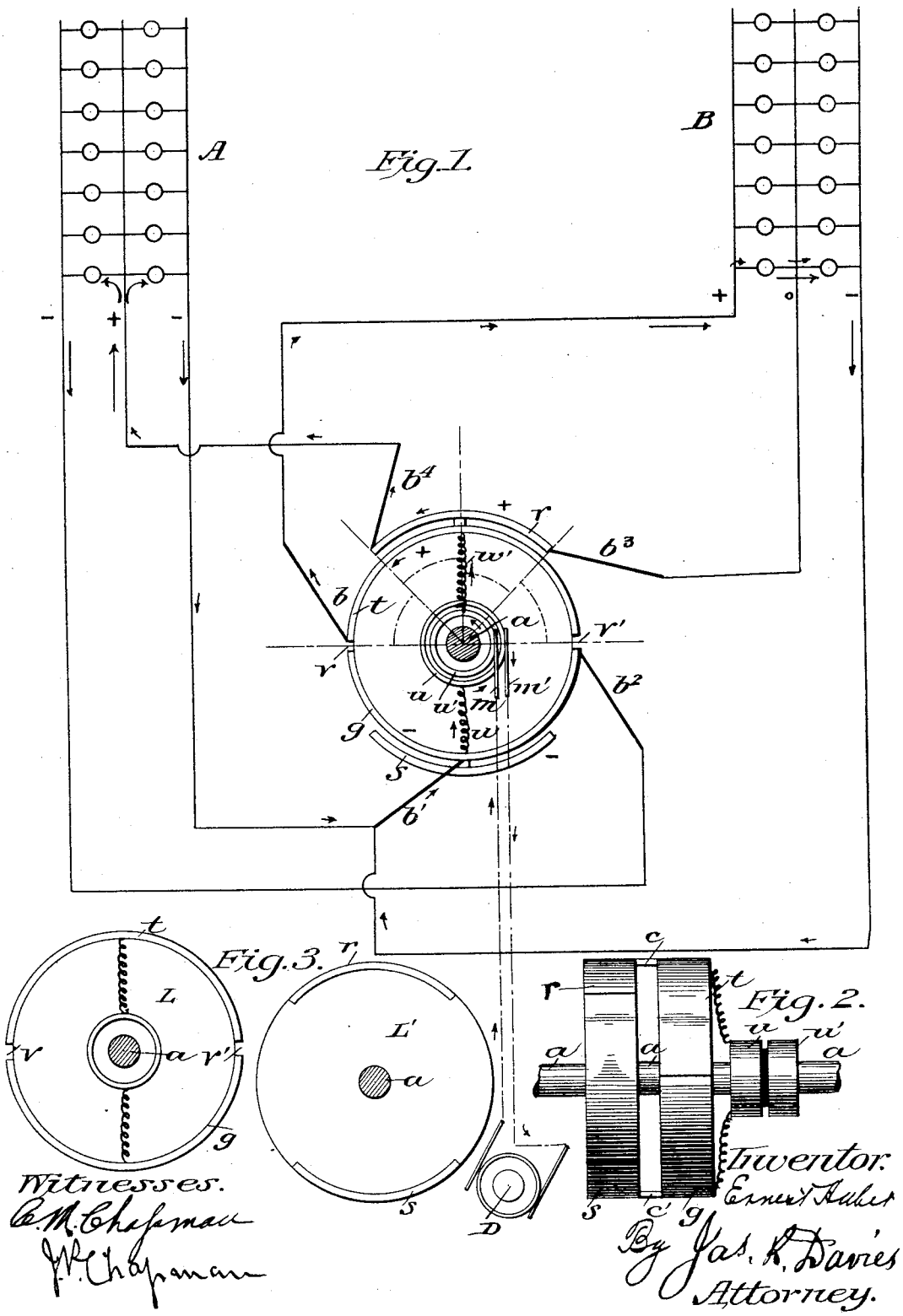

ERNEST HUBER, OF NEW YORK, N. Y.

SYSTEM OF ELECTRIC LIGHTING.

SPECIFICATION forming part of Letters Patent No. 481,904, dated August 30, 1892.

Application filed October 7, 1891. Serial No. 407,980. (No model.)

*To all whom it may concern:*

Be it known that I, ERNEST HUBER, a citizen of the United States, residing at New York, in the county of New York and State of New York, have invented certain new and useful Improvements in Systems of and Apparatus for Distributing Electric Power to Light and Motor Circuits; and I do hereby declare the following to be a full, clear, and exact description of the invention, such as will enable others skilled in the art to which it appertains to make and use the same.

Figure 1 is a plan of the apparatus, showing the driving-shaft in section and the system of circuits leading, in the present instance for illustration merely, to light-circuits, showing, also, the connection between the generator and the apparatus. Fig. 2 is a side elevation of the apparatus, showing a section only of the shaft, and Fig. 3 is a detail of the two disks provided with ring-segments.

This invention relates to a system of distributing electric power or energy throughout a system of light or motor circuits in such a way that the energy used up in the circuits is reduced to a minimum with a maximum effect.

It has been found from experiments that incandescent lights waste a great deal of electric energy, and in order to avoid in whole or in part such waste I have invented a system of distribution whereby the waste may be reduced to a minimum, and instead of lighting with a given current a number of lamps only equal to $a$ I can feed $a + b$ lamps without diminishing the light effects of the lamps—*i. e.*, without reducing the candle-power of the lamps. A system has heretofore been tried which consists in interrupting a strong current of electricity a number of times in quick succession, which interruptions, according to the theory, would not be perceived if they were quick enough—that is to say, on the theory that the eye would retain the impression of a strong light for a short space of time the interruptions were made to occur about fifteen times per second (more or less) and the light would appear to be constant, because the eye would fail to notice the interruptions. This system, however, has been found to be defective and impracticable, for if the current feeding the incandescent lamps be suddenly opened or interrupted it will be found that for a moment the lamps will continue to glow, but with rapidly-decreasing intensity. Therefore it is evident that the light given out by the lamps from the moment of stopping the current until the entire extinction of the lamps is entirely lost in the ordinary method of feeding lamps with a constant current. Furthermore, if after the interruption of the current a current be again run into the lamps it will be seen that the candle-power is not reached instantly, but by degrees. Thus it requires a certain time and a certain current to heat the filaments of the lamps from zero to the point where they will merely glow or become red-hot and an additional time and additional current potential to heat them from the glowing-point to incandescence or white heat. Therefore this old system has been found to be ineffectual and expensive, and therefore impracticable. Now to overcome the defects of the old system and to a considerable extent the expense caused by wasted energy, and therefore to make a practicable and effectual system of electrical lighting or distribution, the following system has been invented: A strong current of electricity feeding one system of lights is suddenly opened and is caused to feed another system of lights; but instead of completely interrupting or cutting off the full current from the first system sufficient of such current is allowed to proceed to the said first system to keep the filaments glowing or red-hot, and so on through as many systems as is desired, the full current being at no time entirely cut off from the respective systems, and manifestly when the full current is again turned into the first system only enough energy is necessary to raise the heat from red heat or glow to white heat or incandescence. This manifestly at each alternation saves in electric energy the difference between zero and the degrees necessary to obtain a glow of the filaments or red heat. Thus the light is not wholly extinguished, as in the old system, but only diminished, because the entire current is never completely withdrawn from the systems.

By utilizing the above principles and by means of the apparatus hereinafter described, I am enabled to save nearly all or the greater part of the heat which, under ordinary circumstances, would be lost or wasted.

The apparatus employed in my improved system comprises a revolving shaft $a$, upon which is mounted a disk L of any suitable insulating material. To the disk L are attached two metallic ring-segments $t$ $g$, arranged in the same circumferential plane and insulated from each other at each end by an interstice, (represented at $v$ $v'$.) Two metallic rings $u$ $u'$, insulated from each other and mounted upon but insulated from the shaft $a$, constitute the electrodes, each being fed by the dynamo D, or by a transformer. The ring $u$ is connected by means of a wire $w$ with the ring-segment $g$, attached to the disk L. Another wire $w'$ connects the ring $u'$ with the other ring-segment $t$, attached to disk L. Brushes $m$ $m'$, bearing, respectively, upon the rings $u$ $u'$, are suitably connected to the dynamo D. Two supplementary ring-segments $r$ $s$ are attached to a disk L' of insulating material which is mounted upon the shaft $a$ in proximity to the disk L. Ring-segments $r$ $s$ are in contact, respectively, with the ring-segments $t$ $g$, the communication being by means of suitable connections $c$ $c'$. Five brushes $b$ $b'$ $b^2$ $b^3$ $b^4$, properly held by suitable brush-holders, take up the current from segments $t$ $g$ and $r$ $s$, which are fed by the electrodes, as hereinbefore set forth, and send it by means of suitable wires to the light or motor circuits.

The light or motor circuit is arranged in two or any suitable number of groups A B. The connection of the brushes with the different circuits is clearly shown in the drawings. In circuit A, for position shown in the drawings, we have : $-+-$, (multiple arc,) and for B we have : $+$ o $-$, (series connection.) Ninety degrees farther on we get for A : $-$o$+$; and for B we get : $+-+$, &c. Twice during one revolution of shaft $a$ each of the groups A B is therefore inserted twice in multiple arc and twice in series connection—that is to say, say, each group doubles the resistance twice and changes signs twice. It is manifest that by subdividing the segments $t$ $g$ and $r$ $s$ the number of changes and the variations of resistance may be multiplied.

The generator furnishing the power may be a constant-current dynamo or an alternator, respectively the secondary coils of a transformer.

I have described in illustration of my invention one form of apparatus for carrying it into effect; but I do not limit myself to the particular details hereinbefore set forth, because manifestly the same can be widely varied by the skilled electrician without departure from the principle of my invention. In all previous plans, so far as known to me, of distributing the current from a source of electrical supply to a plurality of working circuits, (or groups of working circuits,) so that each in turn shall receive its maximum current, the current is cut off from all the circuits except that which is receiving the maximum. Under my invention it is not interrupted at any time in any of the circuits; but while one circuit or group of circuits or translating devices is being supplied with its maximum current the current in the remaining circuits, although diminished, is not interrupted, and this I believe to be new with me.

What, therefore, I claim herein as new and of my own invention is—

1. A system of electrical distribution comprising two or more work circuits, a generator continuously supplying said circuits, and means for varying the current in each circuit, the arrangement being such that each work circuit successively receives its maximum current from the generator, while in the other circuits the current is diminished, but not interrupted, substantially as and for the purposes hereinbefore set forth.

2. The combination of two or more circuits and translating devices included therein, a generator continuously supplying the same, and means whereby the translating devices in the successive circuits are placed alternately in multiple and in series, substantially as and for the purposes hereinbefore set forth.

3. The combination of a revolving shaft carrying a series of ring-segments and a series of electrodes, the ring-segments being arranged in insulated pairs in the same circumferential plane, connections between a segment of one pair and a segment of another pair, a series of collecting mediums, a source of electric energy, connections between the source of energy and the electrodes and between the electrodes and segments, and a series of distributing-wires complemental to the collecting mediums.

4. The combination of a revolving shaft carrying a series of insulated ring-segments and a series of insulated electrodes, the segments being arranged in insulated pairs in the same circumferential plane, connections extending from a segment of one pair to a segment of another pair, the electrodes being arranged in pairs, connections between the electrodes and segments, a source of electric energy and connections between such source and the electrodes, and current-collecting mediums from which extend distributing-wires.

5. The combination of a revolving shaft carrying a series of insulated ring-segments and a series of insulated electrodes, the segments being arranged in insulated pairs in the same circumferential plane, the pairs being arranged relatively to each other in different vertical planes, connections extending from a segment of one pair to a segment of another pair, the electrodes being arranged in different vertical planes in proximity to each other and to the segments, connections between the electrodes and the segments, a source of electric energy and connections between such source and the electrodes, and current-collecting mediums from which extend distributing-wires.

6. The combination of a revolving-shaft carrying a series of electrodes and a series of disks of insulating material, each disk being provided with a series of ring-segments, a segment of one series being connected to a segment of another series, a source of electric energy, current-collecting mediums, connections between the source of energy and the electrodes and between the electrodes and ring-segments, and a series of distributing-wires.

7. The combination of a revolving shaft carrying a series of insulated electrodes and a series of disks of insulating material, each disk being provided with a series of insulated ring-segments, a segment of one series being connected to a segment of another series, a source of electric energy, current-collecting mediums, connections between the source of energy and the electrodes and between the electrodes and ring-segments, and a series of distributing-wires.

8. The combination of a revolving shaft carrying a series of insulated electrodes and a series of disks of insulating material, each disk being provided with a series of insulated ring-segments arranged in the same circumferential plane, a segment of one series being connected to a segment of another series, a source of electric energy, current-collecting mediums, connections between the source of energy and the electrodes and between the electrodes and ring-segments, and a series of distributing-wires.

9. The combination of a revolving shaft carrying a series of insulated electrodes and a series of disks of insulating material, each disk being provided with a series of insulated ring-segments, a segment of one series being connected with a segment of another series, a source of electric energy, current-collecting mediums, connections between the source of energy and the electrodes and between the electrodes and ring-segments, and a series of distributing-wires.

10. The combination of a revolving shaft carrying a series of electrodes insulated from the shaft and from each other and arranged in parallel vertical planes, a series of insulating-disks carried by said shaft and each provided with a series of insulated ring-segments, a segment of one series being connected to a segment of another series, current-collecting mediums, a source of electric energy, and connections extending from the source of energy to the electrodes and from the latter to the segments.

11. The combination of a revolving shaft carrying a series of electrodes and also a series of disks of insulating material, the disks being insulated from each other and arranged in parallel vertical planes and each disk carrying a pair of ring-segments arranged in the same circumferential plane, a segment of one series being connected to a segment of another series, current-collecting mediums, a source of electric energy, and connections extending from the source of energy to the electrodes and from the electrodes to the segments.

12. The combination of a revolving shaft carrying a series of electrodes insulated from the shaft and from each other and arranged in parallel vertical planes, a series of disks of insulating material insulated from each other and carried by said shaft, each disk being provided with a series of insulated ring-segments arranged in the same circumferential plane, a segment of one series being connected to a segment of another series, current-collecting mediums, a source of electric energy, and connections extending from the source of energy to the electrodes and from the electrodes to the segments.

In testimony whereof I affix my signature in presence of two witnesses.

ERNEST HUBER.

Witnesses:
  C. S. TAYLOR,
  JOSEPH P. MURRAY.